(12) United States Patent
Vermaning et al.

(10) Patent No.: US 12,499,210 B2
(45) Date of Patent: Dec. 16, 2025

(54) SECURITY AGAINST PHYSICAL KEYSTROKE SIMULATION

(71) Applicant: SOPHOS LIMITED, Abingdon (GB)

(72) Inventors: Alexander Vermaning, Enschede (NL); Ronny Henk Gert Tijink, Hengelo (NL); Mark Willem Loman, Overijssel (NL); Lute Edwin Engels, Hengelo (NL)

(73) Assignee: Sophos Limited, Abingdon (GB)

( * ) Notice: Subject to any disclaimer, the term of this patent is extended or adjusted under 35 U.S.C. 154(b) by 247 days.

(21) Appl. No.: 18/075,740

(22) Filed: Dec. 6, 2022

(65) Prior Publication Data

US 2024/0184880 A1    Jun. 6, 2024

(51) Int. Cl.
*G06F 21/51*    (2013.01)
*G06F 21/54*    (2013.01)

(52) U.S. Cl.
CPC .............. *G06F 21/51* (2013.01); *G06F 21/54* (2013.01)

(58) Field of Classification Search
CPC .................................. G06F 21/51; G06F 21/54
See application file for complete search history.

(56) References Cited

U.S. PATENT DOCUMENTS

| | | | |
|---|---|---|---|
| 10,592,587 B2* | 3/2020 | Ciabarra, Jr. | G06F 40/106 |
| 10,650,141 B2 | 5/2020 | Loman et al. | |
| 11,068,591 B2* | 7/2021 | Lundgren | G06F 21/566 |
| 11,372,570 B1* | 6/2022 | Kamo | G06F 3/0608 |
| 11,513,921 B1* | 11/2022 | Yadav | G06F 11/1435 |
| 2009/0049552 A1* | 2/2009 | Williamson | G06F 21/566 726/24 |
| 2016/0042175 A1* | 2/2016 | Boodaei | G06F 21/83 726/22 |
| 2017/0228536 A1* | 8/2017 | Malhotra | G06F 21/604 |
| 2018/0018460 A1* | 1/2018 | Brown | G06F 21/554 |
| 2019/0034634 A1* | 1/2019 | Hajmasan | G06F 21/566 |
| 2021/0097186 A1* | 4/2021 | Mandal | G06F 21/552 |
| 2021/0160265 A1* | 5/2021 | Chittaro | H04L 63/1425 |
| 2022/0247797 A1* | 8/2022 | Leduc | A63F 13/79 |
| 2023/0062052 A1* | 3/2023 | Sheshadri | H04L 63/0272 |
| 2023/0161866 A1* | 5/2023 | Raber | G06F 9/455 |
| 2024/0020185 A1* | 1/2024 | Benjamin | G06F 9/505 |
| 2024/0272887 A1* | 8/2024 | Bawa | G06F 8/20 |
| 2024/0273201 A1* | 8/2024 | Shah | G06F 11/327 |
| 2024/0289641 A1* | 8/2024 | Price, Jr. | G06N 20/00 |
| 2024/0314168 A1* | 9/2024 | Cohen | G06F 21/53 |
| 2025/0013394 A1* | 1/2025 | Darji | G06F 3/0664 |

OTHER PUBLICATIONS

Detection and Elimination of Spyware (Year: 2018).*

\* cited by examiner

*Primary Examiner* — Linglan Edwards
*Assistant Examiner* — Jacob Benedict Knackstedt
(74) *Attorney, Agent, or Firm* — IP Spring

(57) ABSTRACT

A computer-implemented method includes detecting, by a computing device, a request from a macro included in a document file that is open in a software application executing on the computing device, where the macro comprises executable code and where the document file further includes non-executable document content. The method further includes determining if the request includes simulation of a physical keystroke based on detecting that the request includes a function call to a function that synthesizes keystrokes. The method further includes responsive to determining that the request includes simulation of the physical keystroke, preventing the request from being satisfied.

20 Claims, 5 Drawing Sheets

500

Detect, by a computing device, a request from a macro included in a document file that is open in a software application executing on the computing device, where the macro comprises interpretable code and where the document file further includes non-executable code 502

Determine if the request includes simulation of a physical keystroke based on detecting that the request includes a function call to a function that synthesizes keystrokes 504

Responsive to determining that the request includes simulation of the physical keystroke, prevent the request from being satisfied 506

FIG 5

SECURITY AGAINST PHYSICAL KEYSTROKE SIMULATION

FIELD

Embodiments relate generally to computer security and in particular, security against malicious code that includes requests to simulate a physical keystroke. More particularly, embodiments relate to methods, systems, and computer readable media that prevent requests from a macro included in a document file to simulate a physical keystroke.

BACKGROUND

Attempts at using email messages to perform malicious activities are becoming increasingly sophisticated. Instead of attaching malicious programs to emails, malicious actors are now using macro viruses that are embedded into a document file of a software application, such as Microsoft Word or Excel. A macro virus is a computer virus that is written in the same macro language used by the software application. The macro virus does not depend on the particular operating system and can therefore infect any computing running any kind of operating system.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes detecting, by a computing device, a request from a macro included in a document file that is open in a software application executing on the computing device, where the macro comprises interpretable code and where the document file further includes non-executable document content. The method further includes determining if the request includes simulation of a physical keystroke based on detecting that the request includes a function call to a function that synthesizes keystrokes. The method further includes responsive to determining that the request includes simulation of the physical keystroke, preventing the request from being satisfied.

In some embodiments, the method includes before determining if the request includes simulation of the physical keystroke, modifying code associated with a dynamic library loaded in memory of the computing device such that, if the request includes simulation of the physical keystroke by a call to the dynamic library, a jump instruction to security code is executed. In some embodiments, determining if the request includes simulation of the physical keystroke includes determining, by execution of the security code, that an address of a memory location that the request originates from is associated with heap memory of the computing device. In some embodiments, the method further includes responsive to determining that the request does not include simulation of the physical keystroke, satisfying the request. In some embodiments, the method further includes stopping execution of the macro. In some embodiments, the method further includes causing a user interface to be displayed that includes a warning about the macro. In some embodiments, the method further includes determining, based on a policy associated with the computing device, to terminate the software application. In some embodiments, the method further includes: generating a fingerprint based on the document file, wherein the fingerprint is based at least in part on the macro in the document file and wherein the fingerprint is obtained using a hash function, determining that the fingerprint matches a stored fingerprint associated with a permission to mimic physical keystrokes, and in response to determining that the fingerprint matches the stored fingerprint, permitting the request to be fulfilled.

A computing device comprises one or more processors and one or more computer-readable media, having instructions stored thereon that, when executed by the one or more processors, cause the one or more processors to perform operations comprising: detecting a request from a macro included in a document file that is open in a software application executing on the computing device, wherein the macro comprises executable code and wherein the document file further includes non-executable document content, determining if the request includes simulation of a physical keystroke based on detecting that the request includes a function call to a function that synthesizes keystrokes, and responsive to determining that request includes simulation of the physical keystroke, preventing the request from being satisfied.

In some embodiments, the operations further include before determining if the request includes simulation of the physical keystroke, modifying code associated with a dynamic library loaded in memory of the computing device such that, if the request includes simulation of the physical keystroke by a call to the dynamic library, a jump instruction to security code is executed. In some embodiments, determining if the request includes simulation of the physical keystroke includes determining, by execution of the security code, that an address of a memory location that the request originates from is associated with heap memory of the computing device. In some embodiments, the operations further include responsive to determining that the request does not include simulation of the physical keystroke, satisfying the request. In some embodiments, the operations further include stopping execution of the macro. In some embodiments, the operations further include causing a user interface to be displayed that includes a warning about the macro. In some embodiments, the operations further include determining, based on a policy associated with the computing device, to terminate the software application.

A computer-program product that includes one or more non-transitory computer-readable media with instructions stored thereon that, when executed by one or more computers, cause the one or more computers to perform operations comprising: detecting a request from a macro included in a document file that is open in a software application executing on the computing device, wherein the macro comprises executable code and wherein the document file further includes non-executable document content, determining if the request includes simulation of a physical keystroke based on detecting that the request includes a function call to a function that synthesizes keystrokes, and responsive to determining that request includes simulation of the physical keystroke, preventing the request from being satisfied.

In some embodiments, the operations further include before determining if the request includes simulation of the physical keystroke, modifying code associated with a dynamic library loaded in memory of the computing device such that, if the request includes simulation of the physical keystroke by a call to the dynamic library, a jump instruction to security code is executed. In some embodiments, determining if the request includes simulation of the physical keystroke includes determining, by execution of the security code, that an address of a memory location that the request originates from is associated with heap memory of the computing device. In some embodiments, the operations further include responsive to determining that the request does not include simulation of the physical keystroke, satisfying the request. In some embodiments, the operations further include stopping execution of the macro.

BRIEF DESCRIPTION OF THE DRAWINGS

FIG. 5 is an example flow diagram of a method to prevent requests from a macro included in a document file to simulate a physical keystroke, according to some embodiments described herein.

DETAILED DESCRIPTION

A macro virus in a document file for a software application, such as Microsoft Word or Excel, may include programmed keystrokes that mimic and/or are similar to hardware keystrokes. The macro virus may include logic that mimics keystrokes from hardware-based keyboards. These macros may bypass macro protections in the software application because the simulated keystrokes appear as actual keystrokes to the macro protections and, as a result, appear to originate from the user and not from a macro virus.

Once a macro simulates keystrokes, the macro is able to execute a malicious command that bypasses regular virus-protection software. For example, the macro may use this mode of access to install key sniffer software or key logger software without detection.

In some embodiments, a security application advantageously solves the above problem by detecting a request from a macro included in a document file that is open in a software application executing on a computing device. The security application determines if the request includes simulation of a physical keystroke. For example, the security application may detect that the request includes a function call to a function that synthesizes keystrokes. If the request includes simulation of the physical keystroke, the security application prevents the request from being satisfied. In some implementations, the security application may be a standalone application, part of a security software suite (e.g., firewall, antivirus, antimalware, etc.), part of a device operating system, or a combination of two or more of these.
Network Environment 100

Figure 1:
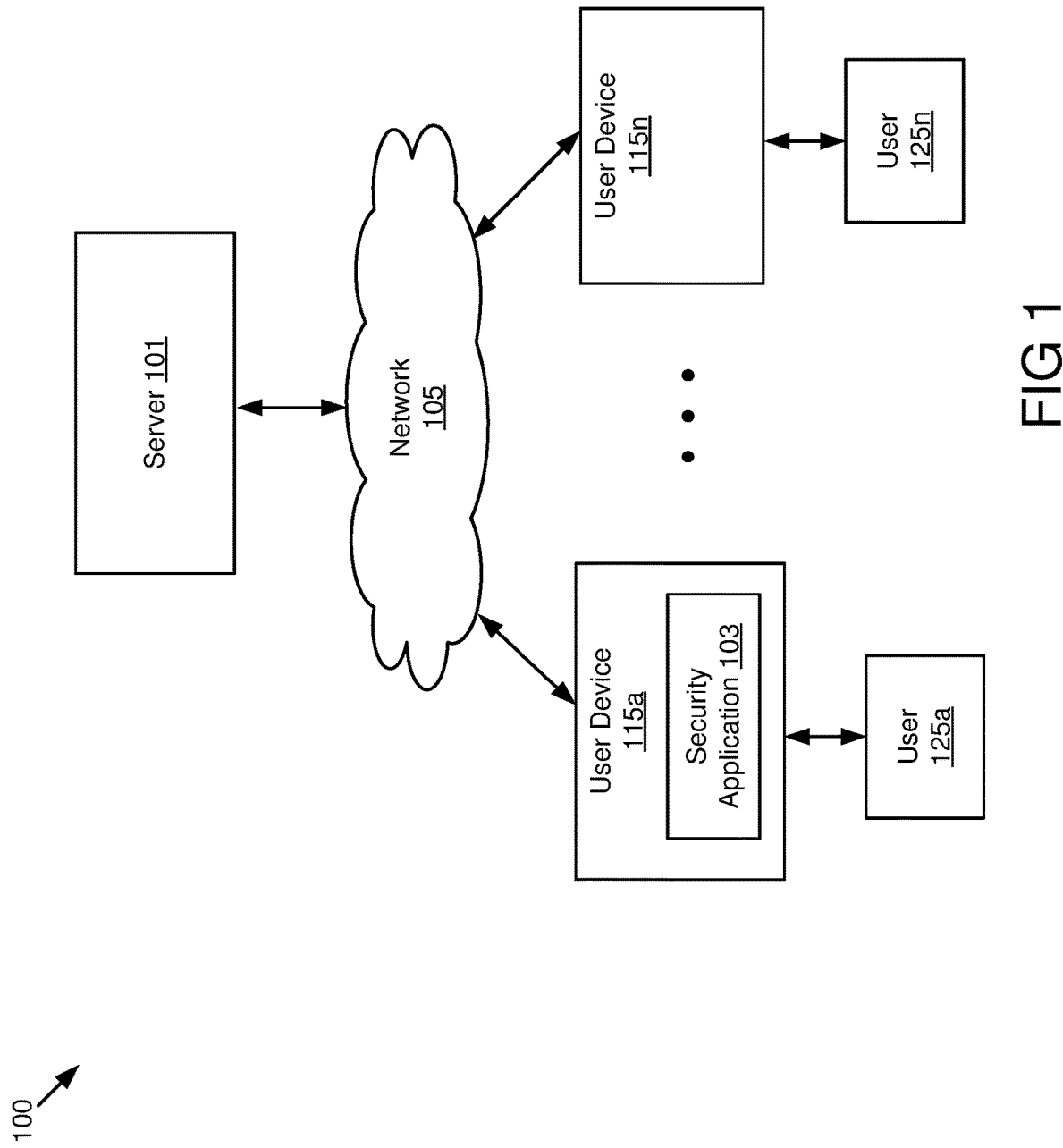
FIG. 1 is a block diagram of an example network environment, according to some embodiments described herein.

FIG. 1 illustrates a block diagram of an example network environment 100. In some embodiments, the network environment 100 includes a server 101, and user devices 115a, 115n, coupled via a network 105. Users 125a, 115n may be associated with the user devices 115a, 115n. In some embodiments, the network environment 100 may include other servers or devices not shown in FIG. 1. For example, server 101 may include multiple servers 101.

In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The server 101 includes a processor, a memory, and network communication hardware. In some embodiments, the server 101 is a hardware server. While FIG. 1 illustrates one server 101, the disclosure applies to a system architecture having one or more servers 101. The server 101 is communicatively coupled to the network 105. In some embodiments, the server 101 sends and receives data to and from the user devices 115a, 115n via the network 105. For example, the server 101 may send an email with a document file as an attachment to a user device 115.

The user device 115 may be a computing device that includes a memory and a hardware processor. For example, the user device 115 may include a desktop computer, a laptop computer, a tablet computer, a mobile device, a smartphone, a wearable device, a reader device, or another electronic device capable of accessing a network 105.

The security application 103 may run in conjunction with an email application (or any other application, such as a word processor, spreadsheet software, presentation software, etc. or independently, as a standalone security application) and identify any requests made associated with received emails. For example, the security application 103 may identify any attachments in emails that are sent to a user device 115. In another example, the security application 103 stored on the user device 115 may operate in conjunction with other applications on the user device 115, such as word-processing applications or spreadsheet applications.

In some embodiments, the user device 115a includes a security application 103 with code and routines operable to detect a request from a macro included in a document file that is open in a software application executing on the user device 115a, where the macro includes interpretable code (e.g., human-readable code written in a scripting language and executable from within the software application) and the document file further includes non-executable document content. For example, the request may be generated when the macro is executed, e.g., automatically (when the document is first opened, when a particular trigger action is detected, etc.) or manually (e.g., when the user performs a certain action such as clicking a button or other user interface element within the user interface of the software application that renders contents of the document file).

The security application 103 determines if the request includes simulation of a physical keystroke based on detecting that the request includes a function call to a function that synthesizes keystrokes. Responsive to determining that the request includes simulation of the physical keystroke, the security application 103 prevents the request from being satisfied. Preventing the request from being satisfied can include pausing or terminating execution of the macro, providing a warning, execution of security software (e.g., to scan memory or other resources of the client device for malware), etc.

In some embodiments, the security application 103 transmits information to the server 101 in response to determining that a request from a macro includes simulation of the physical keystroke. For example, the security application 103 may notify the server 101 that the macro includes simulation of a physical keystroke.

In some embodiments, the security application 103 is executed using hardware including a central processing unit (CPU), a field-programmable gate array (FPGA), an application-specific integrated circuit (ASIC), any other type of processor, or a combination thereof. In some embodiments, the security application 103 may be implemented using a combination of hardware and software.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the user devices 115 and the server 101, in practice one or more networks 105 may be coupled to these entities.

Computing Device 200 Example

Figure 2:
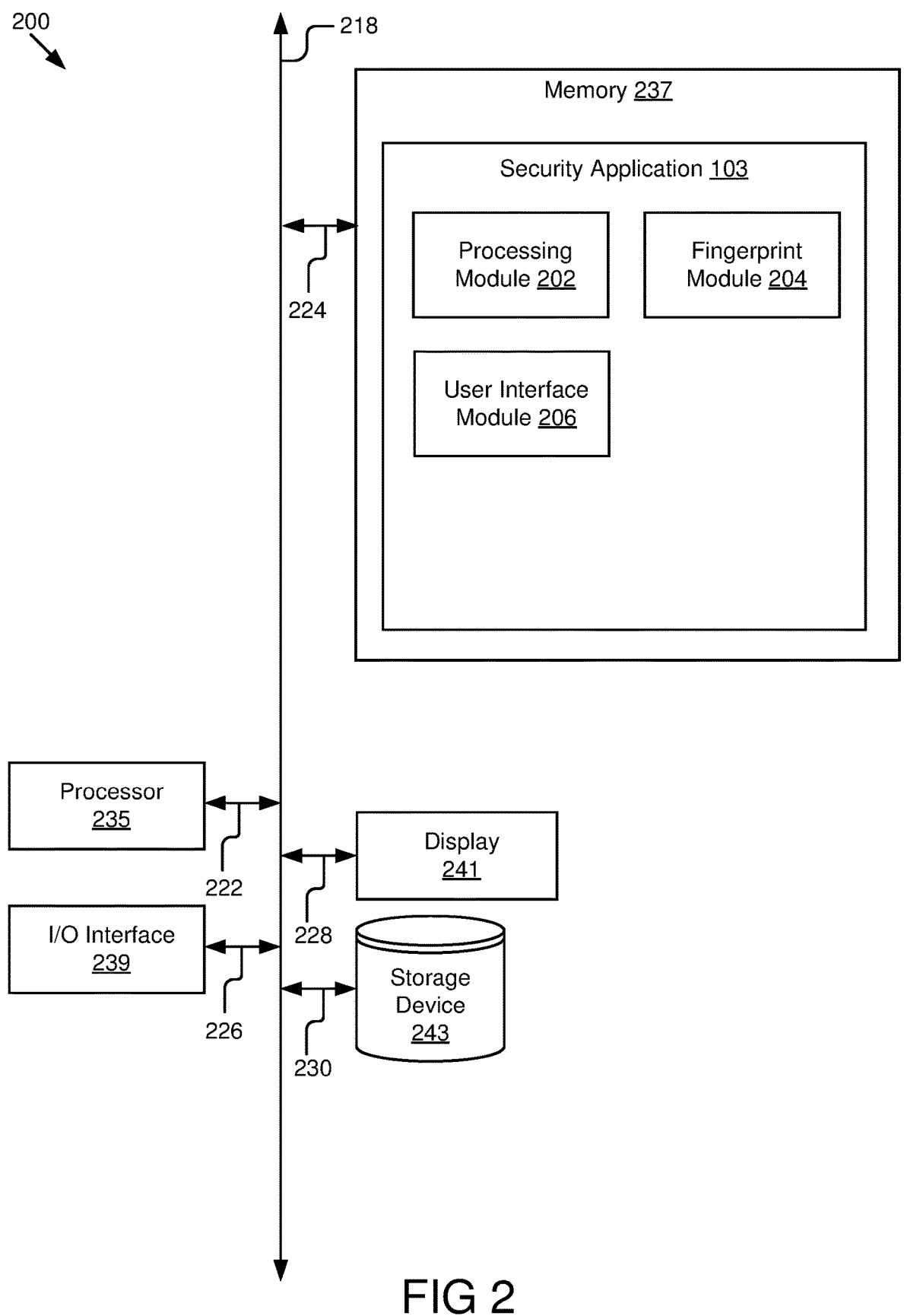
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the user device 115. In some embodiments, computing device 200 is the server 101.

In some embodiments, computing device 200 includes a processor 235, a memory 237, an I/O interface 239, a display 241, and a storage device 243, all coupled via a bus 218.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 218 for communication with the other components via signal line 222.

The memory 237 may be a computer-readable media that stores instructions that may be executed by the processor 235 and/or data. The instructions may include code and/or routines for performing the techniques described herein. The memory 237 may be a dynamic random-access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the security application 103, which is described in greater detail below. The memory 237 is coupled to the bus 218 for communication with the other components via signal line 224.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via the I/O interface 239. In another example, the I/O interface 239 can receive data, such as an input dataset, from an enterprise environment 102 and deliver the data to the security application 103 and components of the security application 103, such as the processing module 202. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). The I/O interface 239 may include a network interface, e.g., a local area network interface such as an Ethernet port, a wireless interface (e.g., WiFi, Bluetooth, etc.), or other interfaces that enable device 200 to connect a local network and/or a remote network. The I/O interface 239 is coupled to the bus 218 for communication with the other components via signal line 226.

Some examples of interfaced devices that can connect to I/O interface 239 can include a display 241 that can be used to display content, e.g., a warning about the macro. The display 241 can include any suitable display device such as a liquid crystal display (LCD), light emitting diode (LED), or plasma display screen, cathode ray tube (CRT), television, monitor, touchscreen, three-dimensional display screen, or other visual display device. The display 241 may be coupled to the bus 218 via signal line 228.

The storage device 243 stores data related to the security application 103. For example, responsive to obtaining user consent to store the information, the storage device 243 may store information about instances where a document file was determined to have a macro virus and/or fingerprints associated with document files. In embodiments where the security application 103 is part of the server 101, the storage device 243 is the same as the database 199 in FIG. 1. The storage device 243 may be coupled to the bus 218 via signal line 230.

In some embodiments, components of the computing device 200 may not be present depending on the type of computing device 200 or additional components may be present. For example, if the computing device 200 is a server 101, the computing device 200 may not include the display 241.

Example Security Application 103

FIG. 2 illustrates a computing device 200 that executes an example security application 103 stored in the memory 237. In this example, the security application 103 includes a processing module 202, a fingerprint module 204, and a user interface module 206. Although the modules are illustrated as being part of the same security application 103, it may be recognized that the modules may be implemented by different entities in the network environment 100. For example, the security application 103 on the server 101 may implement the fingerprint module 204 while the security application 103 on the user device 115a may implement the processing module 202 and the user interface module 206.

The processing module 202 may determine whether a request from a macro simulates a physical keystroke. In some embodiments, the processing module 202 includes a set of instructions executable by the processor 235 to determine whether the request from the macro simulates the physical keystroke. In some embodiments, the processing module 202 is stored in the memory 237 of the computing device 200 and can be accessible and executable by the processor 235.

The processing module 202 detects a request from a macro included in a document file that is open in a software application executing on the computing device 200. For example, the software application may be Microsoft Word®, Microsoft Excel®, Microsoft PowerPoint®, Microsoft Office®, Microsoft Outlook®, Photoshop, MacOS Automator and its Windows equivalents, etc. Other example applications with macro capability may include any document viewing/editing application, spreadsheet application, presentation application, image processing application, audio/video editing application, or any other application that supports automation via scripting and/or macros. In some implementations, if the device operating system supports macros or automation, the software application may include the device operating system. In some implementations, a document file may include a macro (interpretable code, such as executable code) and no non-executable content. Further, in some implementations, the document file may be considered open when macro execution is initiated, even if no application user interface is displayed to the user. The request may occur after a user attempts to access the document file via the computing device and is using the software application. In some implementations, the document file may include non-executable document content in addition to one or more macros. For example, the document file may be a Microsoft Word® document that the user is editing for work or a Microsoft Excel® document where the user is revising a spreadsheet.

In some embodiments, before the processing module 202 receives requests from macros, the processing module 202 modifies code associated with a dynamic library loaded into the memory 237 of the computing device 200. For example, the dynamic library may be a dynamic link library (e.g., Windows file with the extension DLL). The code is modified such that, if the request from the macro includes simulation of a physical keystroke by a call to the dynamic library, a jump instruction to security code is executed. In effect, the jump instruction causes security code to execute when a function for simulation of physical keystrokes is called, prior to the code of the function being executed. In some embodiments, the request originates from an address in heap memory of the computing device 200. In some embodiments, the request originates from a load of modules, such as image memory. In some embodiments, the processing module 202 determines, by execution of the security code, that an address of a memory location that the request originates from is associated with the heap memory of the computing device 200.

Figure 3:
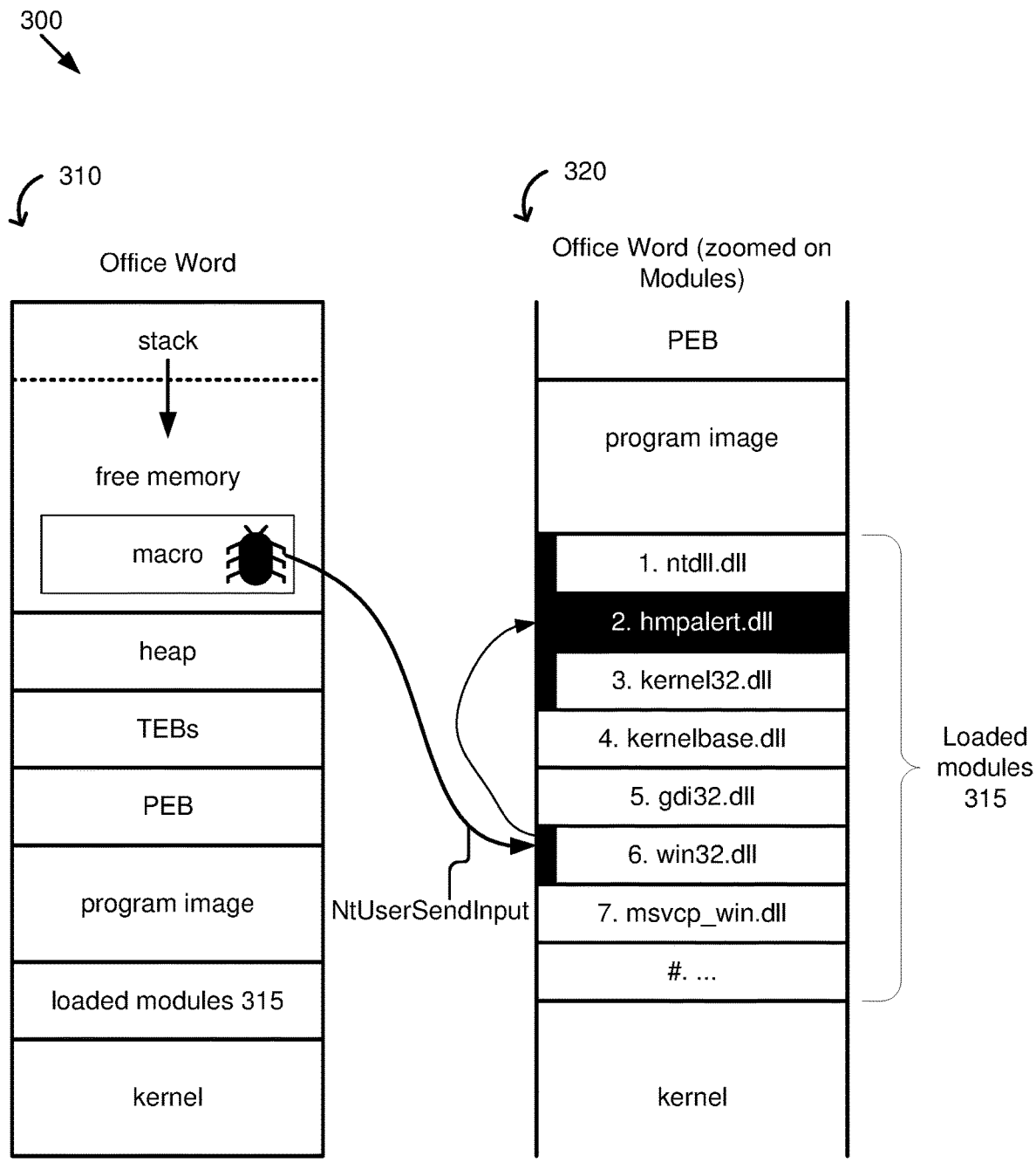
FIG. 3 is a block diagram of an example memory layout and an expanded memory layout, according to some embodiments described herein.

Turning to FIG. 3, a block diagram 300 of an example memory layout 310 and an expanded memory layout 320 is illustrated. Each running program has its own memory layout, separated from other programs. The layout includes segments. In this example, the running program is Office Word (Microsoft Word®) and the segments for the memory layout 310 include: free memory, a heap, thread environment blocks (TEBs), process environment block (PEB), a program image, loaded modules 315, and the kernel (i.e., an operating system kernel). The macro resides in the free memory.

The expanded memory layout 320 includes the PEB, the program image, and within the loaded modules 315 are Windows dynamic link libraries. The loaded modules 315 include ntdll.dll, hmpalert.dll, kernel32.dll, gdi32.dll, win32.dll, msvcp_win.dll, and so on.

The DLL for Office Word is win32.dll. Once win32.dll is loaded into memory, the processing module 202 manipulates the code of the dll in memory and places a jump instruction at the first instruction of NtUserSendInput function. The jump instruction points to a memory area where the processing module 202 can perform an inspection (of the request) for a simulation of a physical keystroke. Because the dll is modified in-memory without modifying the stored copy of the dll, nothing in the code for Win32.dll changes.

In this example, the macro simulates the physical keystroke using the NtUserSendInput function call to win32.dll from the free memory, resulting in the execution of the jump instruction to security code. Once memory is allocated, the function call originates with the heap. When the NtUserSendInput function is called, the processing module 202 checks which memory area is calling the NtUserSendInput function. If the call comes from the heap, as is the case in this example, the processing module 202 blocks the function call.

Conversely, if the function call came from the program image itself (untampered software application code), the processing module 202 is configured allow the request to be satisfied. The memory location for the function call is important because there are multiple legitimate reasons why a program may be using the NtUserSendInput function in which case the request is to be permitted. For example, a screen reader program or another application that is installed by a user may include macros that help a user perform various actions, e.g., insert large sections of text into documents to save time.

The processing module 202 determines if the request includes simulation of a physical keystroke based on detecting that the request includes a function call to a function that synthesizes keystrokes, for example, using the steps described above with reference to FIG. 3.

The processing module 202 determines whether the request includes simulation of the physical keystroke. If the request includes simulation of the physical keystroke, the processing module 202 prevents the request from being satisfied. In some embodiments, the processing module 202 additionally terminates execution of the macro. If the request does not include simulation of the physical keystroke, the processing module 202 satisfies the request.

In some embodiments where the request includes simulation of the physical keystroke, the processing module 202 determines based on a policy associated with the computing device 200 to terminate the software application that runs the macro.

The fingerprint module 204 generates a fingerprint based on the document file. In some embodiments, the fingerprint module 204 includes a set of instructions executable by the processor 235 to generate the fingerprint. In some embodiments, the fingerprint module 204 is stored in the memory 237 of the computing device 200 and can be accessible and executable by the processor 235.

In some embodiments, there may be instances where a macro has a legitimate reason to stimulate physical keystrokes. The fingerprint module 204 may generate a fingerprint that can be used to determine that the macro has permission to mimic physical keystrokes.

In some embodiments, the fingerprint module 204 generates a fingerprint based on the document file. For example, the fingerprint may be based on a combination of information in the application process, the memory region, the owner of the memory region (e.g., the dynamic library or the application itself), and keystrokes being stopped. The fingerprint module 204 may apply a hash function the document file (or portions thereof, e.g., one or more portions corresponding to the macro) to obtain the fingerprint. The hash function may generate fingerprints that are unique to the particular code. In some embodiments, the hash includes the keystrokes being stopped by the processing module 202.

The hash function may be such that fingerprints for pieces of malicious code (e.g., macro virus) are more similar to those for other malicious code, than fingerprints for non-malicious code. In these cases, when the processing module 202 determines that the request from the macro includes simulation of the physical keystroke, the fingerprint module 204 determines that the fingerprint matches a stored fingerprint associated with a permission to mimic physical keystrokes. In response to determining that the fingerprint matches the stored fingerprint, the fingerprint module 204 permits the request from the macro to be fulfilled.

The user interface module 206 may generate and cause a user interface to be displayed. In some embodiments, the user interface module 206 includes a set of instructions executable by the processor 235 to generate the user interface. In some embodiments, the user interface module 206 is stored in the memory 237 of the computing device 200 and can be accessible and executable by the processor 235.

The user interface module 206 generates a user interface (e.g., a graphical UI or other types of user interface) that is displayed by the display 241. The user interface may be displayed on a computing device as part of the macro application 103, as a website, or as a separate graphical interface, and may generally provide an interface for user interaction with the processing module 202, e.g., to view a warning about the macro, to define or modify a policy about how to respond to a macro virus, to add or modify user preferences, etc.

Figure 4:
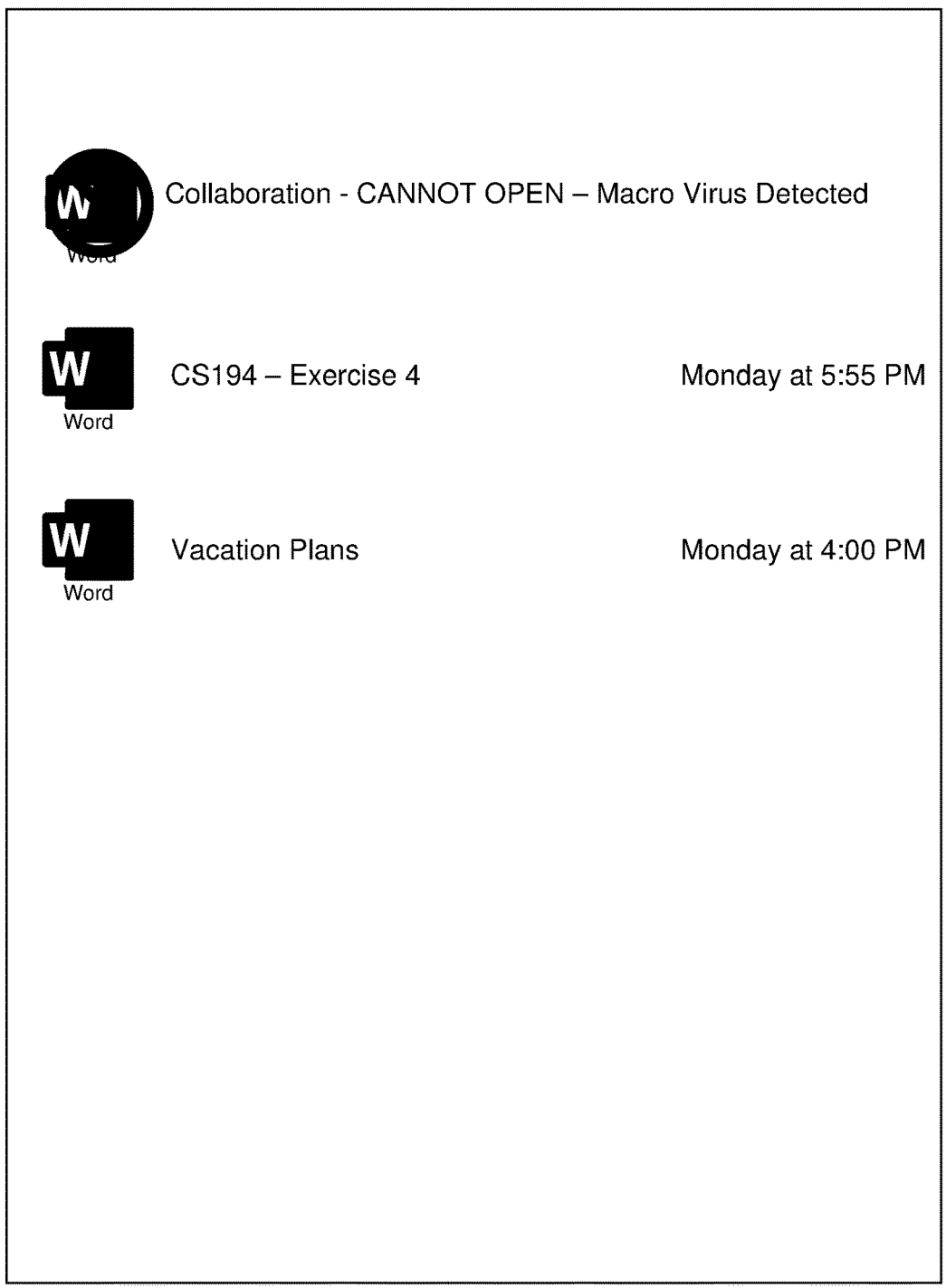
FIG. 4 is an example user interface that includes a warning to the user about the macro virus, according to some embodiments described herein.

FIG. 4 is an example user interface 400 that includes a warning to the user about the macro virus, according to some embodiments described herein. In this example, the Microsoft Word® document file entitled "Collaboration" is displayed with a warning that the document file can not be opened because a macro virus was detected.

Example Method

FIG. 5 is an example flow diagram of a method 500 to prevent requests from a macro included in a document file to simulate a physical keystroke. The method illustrated in method 500 is performed by a computing device 200 where the computing device may be user device 115, a server 101, or in part a user device 115 and in part a server 101.

The method 500 may begin at block 502. At block 502, a computing device detects a request from a macro included in a document file that is open in a software application executing on the computing device, where the macro comprises interpretable code and where the document file further includes non-executable code. Block 502 may be followed by block 504.

At block 504, it is determined whether the request includes simulation of a physical keystroke based on detecting that the request includes a function call to a function that synthesizes keystrokes. Block 504 may be followed by block 506.

At block 506, responsive to determining that the request includes simulation of the physical keystroke, the request is prevented from being satisfied.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

In some instances, user permission is obtained before the steps described above are implemented. For example, user permission may be obtained before any data about a document file is stored.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
    detecting, by a computing device, a request from a macro included in a document file that is open in a software application executing on the computing device, wherein the macro comprises interpretable code and wherein the document file further includes non-executable document content;
    modifying code associated with a dynamic library loaded in memory of the computing device, such that, responsive to the request including simulation of a physical keystroke by a function call to a function in the dynamic library that synthesizes keystrokes, a jump instruction to security code is executed;
    determining if the request includes simulation of the physical keystroke based on detecting that the request includes the function call to the function that synthesizes keystrokes and based on determining that the function call originates with an address of a memory location from heap memory of the computing device; and
    responsive to determining that the request includes simulation of the physical keystroke, preventing the request from being satisfied by executing the jump instruction to the security code, wherein execution of the security code causes termination of the macro.

2. The computer-implemented method of claim 1, wherein the execution of the security code further includes executing security software to scan the computing device for malware.

3. The computer-implemented method of claim 1, wherein the function call to the dynamic library includes a NtUserSendInput function.

4. The computer-implemented method of claim 1, further comprising responsive to determining that the request does not include simulation of the physical keystroke, satisfying the request.

5. The computer-implemented method of claim 1, wherein the execution of the security code further causes terminating execution of the software application, and the method further comprises causing a user interface to be displayed by the computing device, wherein the user interface includes a warning that the document file cannot be opened.

6. The computer-implemented method of claim 1, further comprising causing a user interface to be displayed that includes a warning about the macro.

7. The computer-implemented method of claim 1, further comprising determining, based on a policy associated with the computing device, to terminate the software application.

8. The computer-implemented method of claim 1, further comprising:
    generating a fingerprint based on the document file, wherein the fingerprint is based at least in part on the macro in the document file and wherein the fingerprint is obtained using a hash function;
    determining that the fingerprint matches a stored fingerprint associated with a permission to mimic physical keystrokes; and
    in response to determining that the fingerprint matches the stored fingerprint, permitting the request to be fulfilled.

9. A computing device comprising:
    one or more processors; and
    one or more memories in communication with the one or more processors, with instructions stored thereon that, when executed by the one or more processors, cause the one or more processors to perform operations comprising:
        detecting a request from a macro included in a document file that is open in a software application executing on the computing device, wherein the macro comprises executable code and wherein the document file further includes non-executable document content;
        modifying code associated with a dynamic library loaded in memory of the computing device, such that, responsive to the request including simulation of a physical keystroke by a function call to a function in the dynamic library that synthesizes keystrokes, a jump instruction to security code is executed;
        determining if the request includes simulation of the physical keystroke based on detecting that the request includes the function call to the function that synthesizes keystrokes and based on determining that the function call originates with an address of a memory location from heap memory of the computing device; and
        responsive to determining that request includes simulation of the physical keystroke, preventing the request from being satisfied by executing the jump instruction to the security code, wherein execution of the security code causes termination of the macro.

10. The computing device of claim 9, wherein the function call to the dynamic library includes a NtUserSendInput function.

11. The computing device of claim 10, wherein the operations further include:
    generating a fingerprint based on the document file, wherein the fingerprint is based at least in part on the macro in the document file and wherein the fingerprint is obtained using a hash function;
    determining that the fingerprint matches a stored fingerprint associated with a permission to mimic physical keystrokes; and
    in response to determining that the fingerprint matches the stored fingerprint, permitting the request to be fulfilled.

12. The computing device of claim 9, wherein the operations further include responsive to determining that the request does not include simulation of the physical keystroke, satisfying the request.

13. The computing device of claim 9, wherein the security code includes terminating execution of the software application and the operations further include causing a user interface to be displayed that includes a warning that the document file cannot be opened.

14. The computing device of claim 9, wherein the operations further include causing a user interface to be displayed that includes a warning about the macro.

15. The computing device of claim 9, wherein the operations further include determining, based on a policy associated with the computing device, to terminate the software application.

16. A computer-program product that includes one or more non-transitory computer-readable media with instructions stored thereon that, when executed by a computing device, cause the computing device to perform operations comprising:

detecting a request from a macro included in a document file that is open in a software application executing on the computing device, wherein the macro comprises executable code and wherein the document file further includes non-executable document content;

modifying code associated with a dynamic library loaded in memory of the computing device, such that, responsive to the request including simulation of a physical keystroke by a function call to a function in the dynamic library that synthesizes keystrokes, a jump instruction to security code is executed;

determining if the request includes simulation of the physical keystroke based on detecting that the request includes the function call to the function that synthesizes keystrokes and based on determining that the function call originates with an address of a memory location from heap memory of the computing device; and responsive to determining that request includes simulation of the physical keystroke, preventing the request from being satisfied by executing the jump instruction to the security code, wherein execution of the security code causes termination of the macro.

17. The computer-program product of claim 16, wherein the execution of the security code further includes executing security software to scan the computing device for malware.

18. The computer-program product of claim 16, wherein the operations further include:

generating a fingerprint based on the document file, wherein the fingerprint is based at least in part on the macro in the document file and wherein the fingerprint is obtained using a hash function;

determining that the fingerprint matches a stored fingerprint associated with a permission to mimic physical keystrokes; and in response to determining that the fingerprint matches the stored fingerprint, permitting the request to be fulfilled.

19. The computer-program product of claim 16, wherein the operations further include responsive to determining that the request does not include simulation of the physical keystroke, satisfying the request.

20. The computer-program product of claim 16, wherein the security code includes terminating execution of the software application and the operations further include causing a user interface to be displayed that includes a warning that the document file cannot be opened.

* * * * *